(12) United States Patent
Haider et al.

(10) Patent No.: US 12,465,304 B2
(45) Date of Patent: Nov. 11, 2025

(54) MONITORING UNIT AND A MEDICAL EXAMINATION SYSTEM

(71) Applicant: Siemens Healthineers AG, Forchheim (DE)

(72) Inventors: Sultan Haider, Erlangen (DE); Gassan Azem, Erlangen (DE); Carsten Thierfelder, Pinzberg (DE); Vivek Nair, Moehrendorf (DE); Henry Kang, Erlangen (DE); Mohd Mahmeen, Amroha (IN)

(73) Assignee: SIEMENS HEALTHINEERS AG, Forchheim (DE)

( * ) Notice: Subject to any disclaimer, the term of this patent is extended or adjusted under 35 U.S.C. 154(b) by 225 days.

(21) Appl. No.: 18/337,714

(22) Filed: Jun. 20, 2023

(65) Prior Publication Data

US 2023/0414187 A1 Dec. 28, 2023

(30) Foreign Application Priority Data

Jun. 24, 2022 (EP) .................................... 22181084

(51) Int. Cl.
*G08B 23/00* (2006.01)
*A61B 6/00* (2006.01)
(Continued)

(52) U.S. Cl.
CPC ............ *A61B 6/4417* (2013.01); *A61B 6/032* (2013.01); *A61B 6/4411* (2013.01); *A61B 6/56* (2013.01);
(Continued)

(58) Field of Classification Search
CPC ..... A61B 6/4417; A61B 6/032; A61B 6/4411; A61B 6/56; A61B 5/0077; A61B 5/1128;
(Continued)

(56) References Cited

U.S. PATENT DOCUMENTS

| 10,976,806 B1* | 4/2021 | Vancamberg | ........ A61B 5/0091 |
| 11,635,331 B2* | 4/2023 | Beall | ..................... G01J 5/0205 374/121 |

(Continued)

OTHER PUBLICATIONS

Nardi C. et al.:"Motion artefacts in cone beam CT: an in vitro study about the effects on the images", Br J Radiol 2016; 89:20150687.
(Continued)

*Primary Examiner* — Tai T Nguyen
(74) *Attorney, Agent, or Firm* — Harness, Dickey & Pierce, P.L.C.

(57) ABSTRACT

A monitoring unit to support a medical workflow for examining a patient, comprises: a base body including multiple attachment slots; multiple sensor units, each of the multiple sensor units being attached to one of the multiple attachment slots and/or permanently fixed to the base body, at least one of the multiple sensor units being configured to collect patient related data, and at least one of the multiple sensor units being configured to collect environmental data. A computing device is configured to: process the patient related data and the environmental data; create output data based on the patient related data and/or the environmental data; and initiate output of the output data via an output device, the output device being configured to receive the output data from the computing device and to output the output data.

25 Claims, 4 Drawing Sheets

(51) Int. Cl.
  *A61B 6/03*      (2006.01)
  *G06V 20/50*    (2022.01)
  *G06V 40/16*    (2022.01)
  *G06V 40/20*    (2022.01)
  *G16H 40/20*    (2018.01)
  *G16H 40/67*    (2018.01)
  *A61B 5/00*      (2006.01)
  *A61B 5/11*      (2006.01)
  *A61B 5/1171*  (2016.01)
  *A61B 5/16*      (2006.01)

(52) U.S. Cl.
  CPC ............ *G06V 20/50* (2022.01); *G06V 40/172* (2022.01); *G06V 40/20* (2022.01); *G16H 40/20* (2018.01); *G16H 40/67* (2018.01); *A61B 5/0077* (2013.01); *A61B 5/1128* (2013.01); *A61B 5/1176* (2013.01); *A61B 5/165* (2013.01); *G06V 2201/03* (2022.01)

(58) Field of Classification Search
  CPC ......... A61B 5/1176; A61B 5/165; A61B 6/46; A61B 6/52; A61B 5/055; A61B 6/035; A61B 6/44; A61B 6/5211; G06V 20/50; G06V 40/172; G06V 40/20; G06V 2201/03; G16H 40/20; G16H 40/67

USPC ...................................................... 340/573.1
  See application file for complete search history.

(56) References Cited

U.S. PATENT DOCUMENTS

| | | |
|---|---|---|
| 2008/0215627 A1 | 9/2008 | Higgins et al. |
| 2020/0323496 A1 | 10/2020 | Eibenberger et al. |
| 2021/0325482 A1* | 10/2021 | Setegn ............... G01R 33/4215 |
| 2022/0160918 A1 | 5/2022 | Beck et al. |
| 2022/0306155 A1* | 9/2022 | Zimmermann ....... B60W 10/30 |
| 2023/0197265 A1* | 6/2023 | Still ....................... G16H 50/20 |
| | | 705/2 |

OTHER PUBLICATIONS

Somatom go.Up: https://www.scilvet.de/fileadmin/editors/GERMANY/Produkte/Bildgebende-Diagnostik/CT/ct_somatom_go_up_va20_data-sheet_hood05162002889273_152104434_4.pdf [abgerufen am Jun. 12, 2023].

* cited by examiner

MONITORING UNIT AND A MEDICAL EXAMINATION SYSTEM

CROSS-REFERENCE TO RELATED APPLICATION(S)

The present application claims priority under 35 U.S.C. § 119 to European Patent Application No. 22181084.9, filed Jun. 24, 2022, the entire contents of which are incorporated herein by reference.

FIELD

One or more embodiments of the present invention relate to a monitoring unit for supporting a medical workflow and a medical examination system.

BACKGROUND

Clinical workflows that are used to examine a patient are typically dependent on multiple variables all of which may potentially lead to a suboptimal outcome of the clinical workflows when deviations from an optimal range of the variables occur. For example, the quality of computer tomography (CT) images may be negatively affected due to counting losses caused by malfunctions of a CT system. Malfunctions may, for example, be a current saturation in photon multiplier tubes of the CT and/or reduced light output in a CT crystal unit which may be caused by high temperatures and/or humidity in the environment of the CT system. Furthermore, patient movement during a medical imaging scan, in particular a CT scan or an X-ray examination, may cause negative effects such as blurring, streaking or shading. It has been found that approximately 21% to 42% of CT in vivo exams have motion artifacts, wherein the leading cause tends to be rolling (100%) followed by nodding (92%) and tilting (67%) as published in Cosimo Nardi et al., "Motion artefacts in cone beam CT: an in vitro study about the effects on the images", Br J Radiol 2016; 89:20150687.

SUMMARY

Artifacts caused by these or other deviations of variables and occurrences during a scan may lead to the need of repeating the corresponding scan which can be a great loss of time and/or resources. Further time loss and/or errors may occur due to the positioning of a patient, e.g. including choosing the ideal CT table height for adequate iso-center localization, which may directly affect the techniques (ATCM) that allow automatic adjustment of tube current at different levels and thus radiation dose and image quality, the preparation of a workflow, e.g. readying a scanner for an examination, and/or the identification of a patient, e.g. a misidentification may lead to the wrong procedure and treatment thus putting the patients and their safety at risk.

It is therefore an object of embodiments of the present invention to provide a mechanism and/or means for improving a medical workflow with regard to at least some of the above-mentioned problems, in particular regarding reliability and/or time efficiency of the medical workflow.

At least this object is met or exceeded by a monitoring unit according to claim 1 and/or as described herein, a medical examination system according to claim 14 and/or as described herein and a method according to claim 15 and/or as described herein. Further advantages and features result from the dependent claims, the description and the attached figures.

According to a first aspect of embodiments of the present invention, a monitoring unit for supporting a medical workflow for examining a patient is provided, the monitoring unit comprising:
- a base body, in particular a housing, wherein the base body comprises multiple attachment slots for modular attachment of sensor units (10) to the base body,
- multiple sensor units (10), wherein the sensor units (10) are each attached to one of the attachment slots and/or permanently fixed to the base body, wherein at least one of the sensor units (10) is configured to collect patient related data, wherein at least one of the sensor units (10) is configured to collect environmental data,
- a computing unit, wherein the computing unit is configured to process the patient related data and the environmental data, wherein the computing unit is configured to create output data based on the patient related data and/or the environmental data, wherein the output data is suitable to support the medical workflow, wherein the computing unit is configured to initiate the output of the output data via an output device (or output means), which is connected to the computing unit, wherein the output device is configured to receive the output data from the computing unit and output the output data.

The monitoring unit may be a box or box-like device. Therein, the base body, in particular the housing, may form the outer walls of the box. The box may be open and/or openable in one direction, in particular in a direction where the attachment slots are positioned. The monitoring unit may be configured to be arranged outside of an examination area of an examination system, in particular a medical imaging device, such as a magnetic resonance (MR) scanner, an X-ray device, a CT scanner or a positron emission tomography (PET) scanner, wherein the examination area may be a region in which a patient is placed during an imaging session/examination. The monitoring unit may e.g. be placed outside of an MR tunnel and/or CT tunnel. The monitoring unit may be configured to be arranged adjacent to the examination area. It may be configured to be arranged above the examination area. For example, the attachment slots may be configured such that the sensor units when installed in the base body are able to observe the area below the monitoring unit and/or sidewards of the monitoring unit. The monitoring unit may be configured to be arranged and/or fastened on top of the entry of the examination area, e.g. on top of the entry hole of the MR and/or CT tunnel. The monitoring unit may comprise additional functional units that are in particular configured to support the medical workflow. For example, the monitoring unit may comprise a lighting unit, configured to provide mood lighting, and/or a lighting connection configured to control an external lighting unit. The monitoring unit may comprise an internal battery, in particular rechargeable internal battery, and/or a power input connection.

The medical workflow may be a medical scan workflow and/or a medical examination workflow, in particular a CT workflow, an MR workflow and/or an x-ray examination workflow. The medical workflow may comprise a scan, in particular imaging scan, of the patient and the preparation of the scan, e.g. warming up the scanner, loading an imaging/scan protocol, positioning of the patient and/or preparation of the patient. The preparation of the patient may for example comprise administering of a contrast agent, giving instructions to the patient and/or inputting/registering patient data. The medical workflow may also comprise steps to be performed after the examination, e.g. disinfecting the examination system.

The base body may comprise one or several attachment slots that are not occupied. The one or several free slots may for example be configured to allow adding additional sensor units. The attachment slots may comprise electronic connections to provide the sensor units with power and/or data connections, e.g. USB connections, that allow an exchange of data from the sensor units to the computing unit and optionally vice versa. The attachment slots may advantageously enable a modular design of the monitoring unit, wherein various different sensor units may be attachable to the monitoring unit. Hence, the monitoring unit may be expandable and/or adaptable according to the need of the respective workflow, the respective examination system and/or the system's maintenance requirements, in particular via the attachment slots. Advantageously, the monitoring unit may thus be used with particular flexibility. The base body may comprise a mechanism and/or means for attachment of additional attachment slots and/or exchange of the existing attachment slots. This may provide even more mechanisms and/or means for flexibility and/or maintenance of the monitoring unit, e.g. when one of the attachment slots is damaged or when more attachment slots are needed.

The environmental data may comprise data about the area around and/or at an examination system where the medical workflow is carried out. For example, the environmental data may comprise information on the surrounding air, in particular information about the composition of the air, the current temperature, in particular of the examination room, and/or information about medical devices, such as positioning of the medical devices and/or status of the medical devices. The patient data may comprise images of the patient, medical data of the patient, such as body temperature and/or pulse, and/or biometric data of the patient, e.g. data that may allow to identify the patient.

The computing unit may comprise a processor and/or an algorithm configured to process the patient related data and the environmental data. The computing unit, in particular via the processor, may provide computing power to process the data acquired by the sensor units. The computing unit may be located inside the base body and/or may be attached to the base body. The computing unit may additionally be configured to process data from further sensor units that may be attached to free attachment slots. Additionally and/or alternatively, the computing unit may be configured to integrate additional applications and/or additional algorithms, in particular artificial intelligence (A.I.) algorithms, to allow additional ways of processing data and/or to allow processing of additional sensor units. The computing unit may be connected and/or connectable to at least one external data device, e.g. an edge computing device, a cloud, a server, a smart watch, patches and tattoos, ingestible pills, smart wrist bands, and/or a data storage device, wherein the computing unit may in particular be configured to receive and implement further algorithms from the external data device. For example, the computing unit may comprise a receiving unit configured to receive external data. Advantageously, with the monitoring unit, in particular via the base body and the attachment slots, a modular hardware unit is provided that can collect data and provide applications via the computing unit. The monitoring unit may in particular be configured to provide the function of a data collecting hub. Therewith the medical workflow can effectively be improved by providing various mechanisms and/or means to observe the patient and the environment. The computing unit may comprise a local storage unit for storing data from the sensor units and/or for storing processed data. The computing unit may be configured to provide external access to the storage unit.

The output device is in particular part of the monitoring unit. The output device may be part of the computing unit and/or may be connected to the computing unit. The output device may be a device that is configured to output the output data to other devices and/or to output the output data in such a way that it can be perceived by a medical and/or technical staff member and or by the patient. The output device may for example be a display, e.g. a monitor or screen, a projector, a sound system, a data transmitter, e.g. a Wi-Fi transmitter. The data transmitter may be connected and/or connectable to a cloud, a computer, a smartphone, a tablet, and/or to a device that is part of the medical workflow, such as an examination table, an examination system such as a medical imaging device, e.g. a CT scanner, and/or a workstation. The output data may preferably be configured such that it supports or is suitable to support and/or improve the medical workflow. The output data may be recommendations or warning messages for a user, e.g. technical and/or medical staff, information and/or instructions for a patient, and/or automatic commands for other devices, in particular devices that are part of the medical workflow. Recommendations for a user may, for example, comprise information that assist in positioning the patient. Information and/or instructions for a patient may for example comprise instructions for the patient when and for how long to hold their breath, help for controlling the patients breathing pattern, and/or a countdown, in particular a visual countdown. The visual countdown may for example be displayed on a screen. The screen may for example be attached and/or integrated to a gantry or examination tunnel of an examination system.

According to an embodiment, the multiple sensor units comprise one or several, optionally all, of the following: a 2D (two-dimensional) camera, a 3D (three-dimensional) camera, a CO2 sensor, a humidity sensor, a total volatile organic compound (TVOC) sensor configured to detect particles in ambient air, a temperature sensor, a vibration sensor, a radar unit. The 2D cameras may be configured to take image data, in particular images and/or continuous image data such as video streams, of the patient, in particular of the patient's face or of the patient's body part which is to be examined, of the technicians and/or of medical staff. The computing unit may be configured to process the image data such that it is anonymized, e.g. by removing parts of the data that could be used to personally identify a patient. The computing unit may be configured to analyse and/or derive a person's, in particular a patient's, behaviour and/or emotional state. The monitoring unit may comprise multiple, in particular two, 2D cameras. For example, the 3D camera may be a combination of two 2D cameras. The computing unit may comprise at least one 2D camera and at least one 3D camera. The 3D camera may be configured to take depth measurements of the patient and/or of the environment. The depth measurements may for example be used by the monitoring unit to determine distances between objects, in particular movable objects, and/or between objects, in particular movable objects, and the patient. The 2D and/or the 3D camera may be connected to the computing unit via a USB connection, e.g. via a USB hub that is part of the attachment slots. The 2D camera and or the 3D camera and/or the orientation of their attachment slot may be configured such that the camera can provide a downward view from above the examination room, in particular from above the patient table. The CO2 sensor may be configured to measure CO2 levels in the ambient air. The CO2 sensor may be a total volatile organic compound (TVOC) sensor and/or be part of the total volatile organic compound sensor. In particular in closed examination rooms, the CO2 concentration may increase over time. This effect may be even more pronounced when multiple people, e.g. the patient as well as medical and technical staff, are in the room for an extended period of time without sufficient ventilation. Increased CO2 concentration may lead to loss of concentration, tiredness and/or reduced well-being of the persons in the room. Furthermore, it has been found that also the risk of a COVID infection may increase with an increasing CO2 concentration, in particular such that doubled CO2 levels can lead to doubled risks of COVID infection in indoor space. Hence monitoring the CO2 concentration may be particularly advantageous. The computing unit may be configured to monitor the CO2 particle level based on the CO2 concentration data from the CO2 and/or TVOC sensor. The computing unit may be further configured to create output data that comprises a suggestion to provide ventilation to a user, e.g. technical and/or medical staff, and/or that automatically initiates a ventilation of the examination room, e.g. by switching on a ventilation unit. This may in particular keep the room in ideal conditions for patients and users and/or reduces the risk of spreading infectious diseases, as a high CO2 level may be a good indicator that the room is poorly ventilated. Additionally and/or alternatively the total volatile organic compound (TVOC) sensor, in particular together with the computing unit, may be configured to determine a pollution in the room, e.g. detect a level of carbon-monoxide. The CO2 sensor, humidity sensor, TVOC sensor, temperature sensor and/or vibration sensor may in particular be configured to collect the environmental data. The base body of the monitoring unit may comprise a vent unit that is configured to provide environmental air to at least one of the sensor units, preferably to multiple sensor units. Advantageously the vent unit may allow to get more accurate environmental data, in particular by providing more representative samples of air of the workflow's environment. For example, in the case of a CT system, malfunctions such as a current saturation in the photon multiplier tubes (PMT) and reduced light output in the crystal may be caused by high temperatures and relative humidity above the optimal level. An example of optimal levels is a temperature between 18° and 23° and relative humidity between 30% and 70%. Deviations from optimal conditions may lead to counting losses that may decrease the quality of CT images. The computing unit may be configured to process and/or analyse environmental data from the humidity sensor and/or the temperature sensor and detect abnormal conditions, in particular conditions where humidity and/or temperature are outside of the optimal range. The output data may comprise a user alert informing the user about non-ideal temperature and/or humidity conditions. Additionally and/or alternatively, the computing unit may be connected to a readings output of the workflow, e.g. a scanner's output, and be configured to analyse the readings output and to create a user alert when irregular changes in readings are detected. The radar unit may be configured to allow object detection and/or tracking. The computing unit may be configured to support a collision avoidance based on data from the radar unit (e.g. between objects and a patient and/or between objects and devices). For example, the computing unit may be configured to use the radar unit's data to determine an imminent and/or possible collision. Additionally and/or alternatively, the radar unit may be configured to detect patient positioning and/or movement. Optionally, the radar unit may be configured to work as a safety mechanism alternative in case one or several cameras fail. The 2D camera, the 3D camera and/or the radar unit may be configured to detect patient and/or staff movement, in particular during a scan.

According to an embodiment, the output data comprises information about the patient and/or the environment. The information may for example be output acoustically and/or on a screen. For example, the output data may be designed such that it can help with positioning the patient, e.g. on a patient table. In particular the output data may comprise positioning advice and/or instructions. The positioning advice and/or instructions may for example be output acoustically and/or as text on a screen. The output data may thus advantageously serve as guidance for the patient and/or for medical and/or technical staff.

According to an embodiment, the output data comprises instructions to automatically adapt the workflow. For example, the output device may be connected to at least one examination system, e.g. medical imaging device, and the output data may be configured such that the parameters of the at least one examination system are adapted based on the environmental data and/or based on the patient data. In particular, the scan parameters of a medical imaging device may be automatically adapted. For example, if a patient movement has been detected, the scan may be restarted or the part of the scan which is affected by the patient movement may be repeated. In another example, if the patient's state of emotion is detected to be not OK, e.g. in pain or anxious, the scan may be automatically interrupted or shortened. Additionally and/or alternatively the output device may be connected to a controlling device or controller that is configured to adapt the environmental conditions, such as a humidity controller and/or a ventilation unit. Advantageously, this embodiment may allow an automatic optimization of the workflow and/or of the workflow conditions.

According to an embodiment, one of the sensor units is a camera, in particular a 2D camera and/or a 3D camera, wherein the camera is configured to collect patient image data, in particular coloured image data, from the patient, in particular including data from the patient's face. This embodiment may advantageously allow to collect patient related data, in order to improve the workflow reliability even with varying patient behaviour.

According to a preferred embodiment, the computing unit comprises an algorithm configured to determine whether the patient's state of emotion matches a predefined emotion state based on the coloured image data, wherein the computing unit is configured to initiate the output of output data when a match to the predefined emotion state is found, wherein the output data in particular comprises information about the emotion state and/or commands to cause an automatic adjustment of lighting. The coloured image data may in particular be RGB data. For example, a red coloured patient face may be an indication of anxiety, e.g. caused by claustrophobic reactions of the patient during a scan, in particular inside a scanning tunnel or gantry. The emotional state of the patient may not always be apparent and/or visible to the medical or technical staff. Patient anxiety may occasionally even lead to a termination of the scan. Furthermore, medical errors, such as motion artefacts, may result from a reactive response due to patient anxiety. Accordingly, the output data may be designed to warn the staff about the patient's anxiety, in particular such that the staff may try and calm the patient to reduce artifacts and/or stop the scan immediately if necessary. Advantageously, this embodiment may work as a detection and/or prediction mechanism of the patient's emotion. It may thus reduce unwanted fluctuations or response time to adverse patient reactions, e.g. reactions caused by device operation. The processing of the patient related data may include an anonymization of the data, in particular such that no data concerning the patient's emotion are stored in a way that they may be assigned to an individual patient later on.

According to an embodiment, the camera is configured to collect the patient image data of the patient's face, in particular when the patient is approaching the monitoring unit and/or entering an examination room, wherein the computing unit comprises a facial recognition algorithm and a patient database or an algorithm configured to access a patient database, wherein the computing unit is configured to identify a patient based on the patient image data and the patient database via the facial recognition algorithm, wherein the computing unit is in particular configured to automatically set a scanning protocol based on the recognized patient identity and based on the patient database. The patient database may include patient faces. An incorrect identification of the patient may lead to patient safety risks, in particular due to applying the wrong procedure and/or treatment, such as due to examination of the wrong patient, applying the wrong medication and/or an incorrect site intervention. Advantageously this embodiment may allow an automated patient identification and/or the application of a health information update of the patient database. Thus, the risk of errors and their consequences may be reduced. An automatic identification upon arrival of the patient may further help to save time and avoid forgetting of the staff to correctly double check the patient's identity.

According to an embodiment, one of the sensor units is a camera, in particular a 2D camera and/or a 3D camera, wherein the computing unit is configured to automatically detect a medical staff member via the camera upon arrival, wherein the computing unit is configured to automatically output information for this particular staff member as output data. The information for the staff member may for example comprise information about the monitoring unit about at least one device of the workflow, about errors and/or about the scan protocol to be applied. In a medical examination centre, e.g. a radiology centre, there may be different staff members with their respective different tasks. Thus, identifying the staff and automating the specific applications may help with executing these tasks more efficiently. The output data may further comprise instructions for at least one device to automatically adapt the user interface according to the detected staff member. Thus, an automatic device personalization depending on the individual staff member's tasks and/or requirements may be possible.

According to an embodiment, at least one of the sensor units is a camera, in particular a 2D camera and/or a 3D camera, wherein the camera is configured to detect movement of the patient, in particular during an examination, wherein the computing unit is configured to output information and/or instructions regarding the positioning of the patient based on the detected movement. For example, the output data may be such that it helps to position the body part to be examined in the iso-centre of the medical imaging device for a scan. The output data may also be suitable to guide a patient to "undo" an involuntary movement during an examination, e.g. the output data may comprise instructions to the patient on how to move back to his/her original position. This embodiment may thus help to detect and/or avoid motion artifacts that may for example appear as blurring, streaking, or shading and that may be caused by patient movement during an examination, in particular during a CT scan and/or x-ray examination. Early detection of movement may help to avoid the repetition of an examination and/or enable correction of movement-induced measurement errors. The output data may comprise a warning for the staff and/or the patient. The warning may in particular be triggered, when exceeding of a movement threshold based on the impact of the movement on image artefacts is detected, in particular as determined by the computing unit based on the patient movement data. Additionally and/or alternatively the movement data may be used to assist a patient positioning. Patient positioning may comprise choosing an ideal table height, in particular of a CT system's table, e.g. for adequate iso-centre localization. The table height may directly affect the techniques that allow automatic adjustment of tube current at different levels and thus radiation dose and image quality in a CT system. Accurate positioning of the patient in the CT gantry may in particular be essential for adequate image quality and radiation output when using tube current modulation. The computing unit may comprise an artificial intelligence (AI) algorithm configured to use the patient movement data in order to create output data that assists in the positioning of the patient. Due to the diversity of human shapes and bodies, the AI ex may offer far more accurate positioning than a positioning carried out by staff without guidance. AI-assisted patient positioning may thus help to accurately find the ideal iso-centre, which may directly affect a required radiation dose and image quality. As a result, it may be more efficient, save time, reduce radiation dose, and require less effort to obtain the desired scan. Alternatively and/or additionally, the computing unit may be configured to create instructions as output data based on the movement and/or positioning data of the patient that causes the power of a scanner to be adjusted automatically, e.g. in the x-ray tube. The adjustment of the power may be determined depending on the body part, e.g. higher power for bone. Optionally the camera data may be supported and/or replaced by data from the radar unit.

According to an embodiment, the computing unit is configured to monitor at least one predetermined surface via at least one of the sensor units, in particular via a camera, wherein the computing unit is configured to output a warning when a touching of the at least one surface by a person is detected, wherein the computing unit is optionally further configured to initiate a highlighting of the touched surface. The highlighting may for example executed by the output device. Therein the output device may be a projector projecting the highlighting onto the surface and/or a screen or output to a screen, the screen showing the surface together with the highlighting. Advantageously this embodiment may provide a surface touch detection in particular with regard to contamination-prone areas. Thereby, the medical workflow may be optimised, because only the touched surfaces need to be disinfected after the examination. This may save valuable time of the staff and decreases the (dead) time between two patient examinations and increase patient throughput.

According to an embodiment, the computing unit is configured to activate a hibernating mode for one or several of the sensor units when the sensor units are not needed according to a predetermined workflow protocol and/or when no patient is within a predetermined range of the monitoring unit. Additionally and/or alternatively, the computing unit may be further configured to activate and end a hibernating mode for external devices, in particular devices that are part of the workflow, based on the predetermined workflow protocol and/or on the presence and absence of the patient. The presence of a patient may for example be determined via a camera and/or via a radar unit. The workflow system may thus be optimized in terms of energy saving. Additionally and/or alternatively, based on the predetermined workflow and/or the detection of an approaching patient the computing unit may be configured to activate at least on sensor unit and/or end the hibernating mode of at least one of the sensor units. Hence the workflow may be optimized for an efficient warm-up period, e.g. decreasing wait times. For example, it may take some time for a CT scanner to be ready for an exam. It was found that the total energy consumption of a CT scanner for one year was 26 226 kWh (corresponding to $4721 in energy costs), which can be considered to be significant. The energy consumption of CT and MRI scanners can be comparable to the energy requirements of a city of 852 residents living in a four-person household, or 4% of the hospital's total annual energy consumption. Hence a hibernating mode when there are no examinations and/or operations based on people presence detection may allow significant savings of energy. Taking into account a schedule of workflows may further help to improve patient throughput by allowing the device to turn on before the patient arrives. This may also contribute to the reduction of costs.

According to an embodiment, the monitoring unit comprises a data connection, in particular a wireless data connection, wherein the computing unit is configured to control the data connection for distributing data to devices used during the workflow. The data connection may for example be a LAN connection and/or a wireless LAN connection and/or a Bluetooth connection. The data connection may be used to store sensor data and/or processed data on a storage device, e.g. in a cloud. The data connection may be used to receive data input for the computing unit that may in particular be used for the processing of the sensor data. For example, wearables with wireless connectivity may provide additional patient health data that can be collected nearby.

According to an embodiment, the computing unit is configured to modularly include algorithms, in particular artificial intelligence (AI) algorithms, for processing data from sensor units that are attached to the attachment slots. Advantageously the data obtained with the monitoring unit may thus be used to implement use cases that rely on machine learning and require a large amount of collected data. Additionally and/or alternatively, the computing unit may be configured to acquire data that can be output to an external device having an AI algorithm. Using the monitoring unit to acquire data for AI algorithms may have the advantage that the feedback is not prone to be subjective as user experience feedback may be. It may thus be possible to develop an understanding of customer and user behaviour based on more reliable data. Therein it may be possible to build an accurate machine learning model for potential applications, e.g. of the "digital twin" (such as adapting device settings to user-specific behaviours and requirements). The sensor units to be installed and/or part of the monitoring unit may provide large amounts of data to be collected over time. Due to the training data, a more efficient analysis may be enabled allowing potential use cases based on machine learning. If enough data is collected, it may be further possible to adjust the settings of devices and/or of the monitoring unit and calibrate it according to the specific behaviour of the user, e.g. the patients and/or the staff, to improve operational efficiency. Additionally and/or alternatively, it may be possible to collect data around the medical devices of the workflow that may allow for better understanding the behaviour of the user, e.g. the staff, and the patient. AI-powered use cases may profit from the thus acquired sufficiently large amounts of data to reasonably capture the correlations between input and output features. By observing patients, it may also be possible to observe and detect pain, which can help identify the relationship between patients' experience of various scanning protocols and/or workflows and the patient's clinical condition. For such applications, it may be necessary to collect enough data to develop more complex and accurate models to improve the performance of such machine learning algorithms. Furthermore, an AI algorithm may be trained with the help of the sensor data to enable an improved image quality acquired via the medical workflow. The AI algorithm may, e.g., be a deep learning algorithm.

According to an embodiment, the output device comprises a beam projector, wherein the beam projector is in particular configured to project the output data on a surface. The beam projector may for example be a laser beam projector. The beam projector may be configured to send simple messages (e.g., cleaning instructions, system messages, breathing instruction, instruction for patient movement, e.g. to undo involuntary movement during an examination) to the patient table or other surfaces. The beam projector may comprise a motorization and/or a motorized lens system to redirect the beam.

According to a further aspect of embodiments of the present invention, a medical examination system, in particular medical imaging system, is provided, comprising the monitoring unit as described herein. All features and advantages of the monitoring unit may be adapted to the medical examination system and vice versa. The medical examination system may for example be a CT scanner or an MR scanner. The medical examination system may comprise a monitor and/or screen in communication with the output device. The monitor and/or screen may be located at and/or attached to a scanning tunnel and/or gantry. The screen may for example be used to help control a breathing pattern for patient by showing instructions to the patient.

According to a further aspect a method for supporting a medical workflow for examining a patient is provided, the method comprising the steps collecting patient related data via at least one first sensor unit;

collect environmental data via at least one second sensor unit, the first and second sensor unit being the same or different sensor units;

sending the patient related data and the environmental data to a computing unit;

creating output data based on the patient related data and/or the environmental data by the computing unit, wherein the output data is suitable to support the medical workflow;

sending the output data from the computing unit to an output device;

outputting the output data via the output device.

The method may be carried out by a monitoring unit as described herein. In particular, the first and second sensor unit, the computing unit and the output device may be as described herein. They may be part of the monitoring unit. All features and advantages of the monitoring unit and of the medical examination system may be adapted to the method and vice versa.

All embodiments mentioned herein may be combined with each other.

BRIEF DESCRIPTION OF THE DRAWINGS

The accompanying drawings illustrate various exemplary embodiments and methods of various aspects of the present invention.

Similar elements are designated with the same reference signs in the drawings.

DETAILED DESCRIPTION

Figure 1:
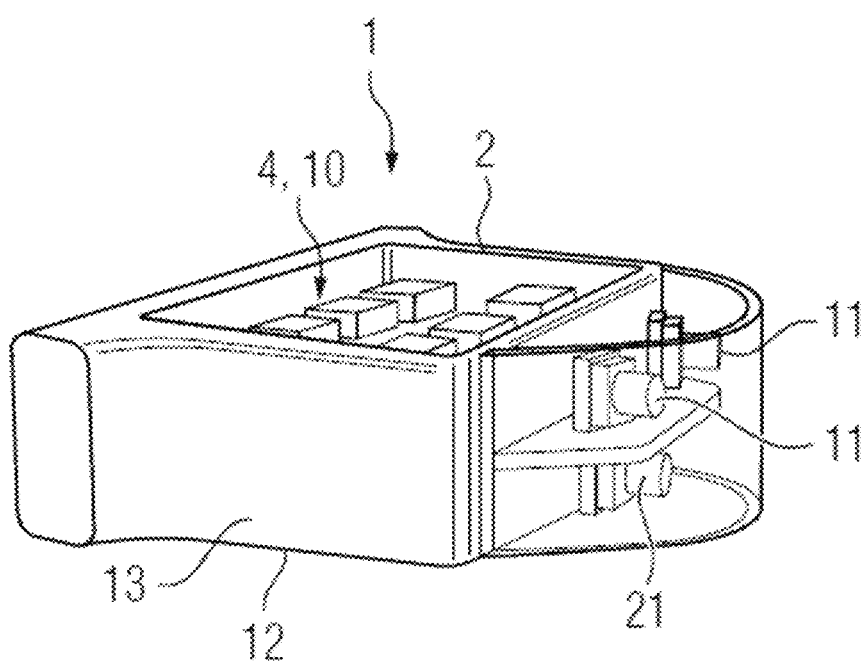
FIG. 1 shows a monitoring unit according to an embodiment of the present invention.

According to a first aspect of embodiments of the present invention, a monitoring unit for supporting a medical workflow for examining a patient is provided, the monitoring unit comprising:

- a base body, in particular a housing, wherein the base body comprises multiple attachment slots for modular attachment of sensor units (10) to the base body,
- multiple sensor units (10), wherein the sensor units (10) are each attached to one of the attachment slots and/or permanently fixed to the base body, wherein at least one of the sensor units (10) is configured to collect patient related data, wherein at least one of the sensor units (10) is configured to collect environmental data,
- a computing unit, wherein the computing unit is configured to process the patient related data and the environmental data, wherein the computing unit is configured to create output data based on the patient related data and/or the environmental data, wherein the output data is suitable to support the medical workflow, wherein the computing unit is configured to initiate the output of the output data via an output device (or output means), which is connected to the computing unit, wherein the output device is configured to receive the output data from the computing unit and output the output data.

The monitoring unit may be a box or box-like device. Therein, the base body, in particular the housing, may form the outer walls of the box. The box may be open and/or openable in one direction, in particular in a direction where the attachment slots are positioned. The monitoring unit may be configured to be arranged outside of an examination area of an examination system, in particular a medical imaging device, such as a magnetic resonance (MR) scanner, an X-ray device, a CT scanner or a positron emission tomography (PET) scanner, wherein the examination area may be a region in which a patient is placed during an imaging session/examination. The monitoring unit may e.g. be placed outside of an MR tunnel and/or CT tunnel. The monitoring unit may be configured to be arranged adjacent to the examination area. It may be configured to be arranged above the examination area. For example, the attachment slots may be configured such that the sensor units when installed in the base body are able to observe the area below the monitoring unit and/or sidewards of the monitoring unit. The monitoring unit may be configured to be arranged and/or fastened on top of the entry of the examination area, e.g. on top of the entry hole of the MR and/or CT tunnel. The monitoring unit may comprise additional functional units that are in particular configured to support the medical workflow. For example, the monitoring unit may comprise a lighting unit, configured to provide mood lighting, and/or a lighting connection configured to control an external lighting unit. The monitoring unit may comprise an internal battery, in particular rechargeable internal battery, and/or a power input connection.

The medical workflow may be a medical scan workflow and/or a medical examination workflow, in particular a CT workflow, an MR workflow and/or an x-ray examination workflow. The medical workflow may comprise a scan, in particular imaging scan, of the patient and the preparation of the scan, e.g. warming up the scanner, loading an imaging/scan protocol, positioning of the patient and/or preparation of the patient. The preparation of the patient may for example comprise administering of a contrast agent, giving instructions to the patient and/or inputting/registering patient data. The medical workflow may also comprise steps to be performed after the examination, e.g. disinfecting the examination system.

The base body may comprise one or several attachment slots that are not occupied. The one or several free slots may for example be configured to allow adding additional sensor units. The attachment slots may comprise electronic connections to provide the sensor units with power and/or data connections, e.g. USB connections, that allow an exchange of data from the sensor units to the computing unit and optionally vice versa. The attachment slots may advantageously enable a modular design of the monitoring unit, wherein various different sensor units may be attachable to the monitoring unit. Hence, the monitoring unit may be expandable and/or adaptable according to the need of the respective workflow, the respective examination system and/or the system's maintenance requirements, in particular via the attachment slots. Advantageously, the monitoring unit may thus be used with particular flexibility. The base body may comprise a mechanism and/or means for attachment of additional attachment slots and/or exchange of the existing attachment slots. This may provide even more mechanisms and/or means for flexibility and/or maintenance of the monitoring unit, e.g. when one of the attachment slots is damaged or when more attachment slots are needed.

The environmental data may comprise data about the area around and/or at an examination system where the medical workflow is carried out. For example, the environmental data may comprise information on the surrounding air, in particular information about the composition of the air, the current temperature, in particular of the examination room, and/or information about medical devices, such as positioning of the medical devices and/or status of the medical devices. The patient data may comprise images of the patient, medical data of the patient, such as body temperature and/or pulse, and/or biometric data of the patient, e.g. data that may allow to identify the patient.

The computing unit may comprise a processor and/or an algorithm configured to process the patient related data and the environmental data. The computing unit, in particular via the processor, may provide computing power to process the data acquired by the sensor units. The computing unit may be located inside the base body and/or may be attached to the base body. The computing unit may additionally be configured to process data from further sensor units that may be attached to free attachment slots. Additionally and/or alternatively, the computing unit may be configured to integrate additional applications and/or additional algorithms, in particular artificial intelligence (A.I.) algorithms, to allow additional ways of processing data and/or to allow processing of additional sensor units. The computing unit may be connected and/or connectable to at least one external data device, e.g. an edge computing device, a cloud, a server, a smart watch, patches and tattoos, ingestible pills, smart wrist bands, and/or a data storage device, wherein the computing unit may in particular be configured to receive and implement further algorithms from the external data device. For example, the computing unit may comprise a receiving unit configured to receive external data. Advantageously, with the monitoring unit, in particular via the base body and the attachment slots, a modular hardware unit is provided that can collect data and provide applications via the computing unit. The monitoring unit may in particular be configured to provide the function of a data collecting hub. Therewith the medical workflow can effectively be improved by providing various mechanisms and/or means to observe the patient and the environment. The computing unit may comprise a local storage unit for storing data from the sensor units and/or for storing processed data. The computing unit may be configured to provide external access to the storage unit.

The output device is in particular part of the monitoring unit. The output device may be part of the computing unit and/or may be connected to the computing unit. The output device may be a device that is configured to output the output data to other devices and/or to output the output data in such a way that it can be perceived by a medical and/or technical staff member and or by the patient. The output device may for example be a display, e.g. a monitor or screen, a projector, a sound system, a data transmitter, e.g. a Wi-Fi transmitter. The data transmitter may be connected and/or connectable to a cloud, a computer, a smartphone, a tablet, and/or to a device that is part of the medical workflow, such as an examination table, an examination system such as a medical imaging device, e.g. a CT scanner, and/or a workstation. The output data may preferably be configured such that it supports or is suitable to support and/or improve the medical workflow. The output data may be recommendations or warning messages for a user, e.g. technical and/or medical staff, information and/or instructions for a patient, and/or automatic commands for other devices, in particular devices that are part of the medical workflow. Recommendations for a user may, for example, comprise information that assist in positioning the patient. Information and/or instructions for a patient may for example comprise instructions for the patient when and for how long to hold their breath, help for controlling the patients breathing pattern, and/or a countdown, in particular a visual countdown. The visual countdown may for example be displayed on a screen. The screen may for example be attached and/or integrated to a gantry or examination tunnel of an examination system.

According to an embodiment, the multiple sensor units comprise one or several, optionally all, of the following: a 2D (two-dimensional) camera, a 3D (three-dimensional) camera, a $CO_2$ sensor, a humidity sensor, a total volatile organic compound (TVOC) sensor configured to detect particles in ambient air, a temperature sensor, a vibration sensor, a radar unit. The 2D cameras may be configured to take image data, in particular images and/or continuous image data such as video streams, of the patient, in particular of the patient's face or of the patient's body part which is to be examined, of the technicians and/or of medical staff. The computing unit may be configured to process the image data such that it is anonymized, e.g. by removing parts of the data that could be used to personally identify a patient. The computing unit may be configured to analyse and/or derive a person's, in particular a patient's, behaviour and/or emotional state. The monitoring unit may comprise multiple, in particular two, 2D cameras. For example, the 3D camera may be a combination of two 2D cameras. The computing unit may comprise at least one 2D camera and at least one 3D camera. The 3D camera may be configured to take depth measurements of the patient and/or of the environment. The depth measurements may for example be used by the monitoring unit to determine distances between objects, in particular movable objects, and/or between objects, in particular movable objects, and the patient. The 2D and/or 3D camera may be connected to the computing unit via a USB connection, e.g. via a USB hub that is part of the attachment slots. The 2D camera and or the 3D camera and/or the orientation of their attachment slot may be configured such that the camera can provide a downward view from above the examination room, in particular from above the patient table. The $CO_2$ sensor may be configured to measure $CO_2$ levels in the ambient air. The $CO_2$ sensor may be a total volatile organic compound (TVOC) sensor and/or be part of the total volatile organic compound sensor. In particular in closed examination rooms, the $CO_2$ concentration may increase over time. This effect may be even more pronounced when multiple people, e.g. the patient as well as medical and technical staff, are in the room for an extended period of time without sufficient ventilation. Increased $CO_2$ concentration may lead to loss of concentration, tiredness and/or reduced well-being of the persons in the room. Furthermore, it has been found that also the risk of a COVID infection may increase with an increasing $CO_2$ concentration, in particular such that doubled $CO_2$ levels can lead to doubled risks of COVID infection in indoor space. Hence monitoring the $CO_2$ concentration may be particularly advantageous. The computing unit may be configured to monitor the $CO_2$ particle level based on the $CO_2$ concentration data from the $CO_2$ and/or TVOC sensor. The computing unit may be further configured to create output data that comprises a suggestion to provide ventilation to a user, e.g. technical and/or medical staff, and/or that automatically initiates a ventilation of the examination room, e.g. by switching on a ventilation unit. This may in particular keep the room in ideal conditions for patients and users and/or reduces the risk of spreading infectious diseases, as a high $CO_2$ level may be a good indicator that the room is poorly ventilated. Additionally and/or alternatively the total volatile organic compound (TVOC) sensor, in particular together with the computing unit, may be configured to determine a pollution in the room, e.g. detect a level of carbon-monoxide. The $CO_2$ sensor, humidity sensor, TVOC sensor, temperature sensor and/or vibration sensor may in particular be configured to collect the environmental data. The base body of the monitoring unit may comprise a vent unit that is configured to provide environmental air to at least one of the sensor units, preferably to multiple sensor units. Advantageously the vent unit may allow to get more accurate environmental data, in particular by providing more representative samples of air of the workflow's environment. For example, in the case of a CT system, malfunctions such as a current saturation in the photon multiplier tubes (PMT) and reduced light output in the crystal may be caused by high temperatures and relative humidity above the optimal level. An example of optimal levels is a temperature between 18° and 23° and relative humidity between 30% and 70%. Deviations from optimal conditions may lead to counting losses that may decrease the quality of CT images. The computing unit may be configured to process and/or analyse environmental data from the humidity sensor and/or the temperature sensor and detect abnormal conditions, in particular conditions where humidity and/or temperature are outside of the optimal range. The output data may comprise a user alert informing the user about non-ideal temperature and/or humidity conditions. Additionally and/or alternatively, the computing unit may be connected to a readings output of the workflow, e.g. a scanner's output, and be configured to analyse the readings output and to create a user alert when irregular changes in readings are detected. The radar unit may be configured to allow object detection and/or tracking. The computing unit may be configured to support a collision avoidance based on data from the radar unit (e.g. between objects and a patient and/or between objects and devices). For example, the computing unit may be configured to use the radar unit's data to determine an imminent and/or possible collision. Additionally and/or alternatively, the radar unit may be configured to detect patient positioning and/or movement. Optionally, the radar unit may be configured to work as a safety mechanism alternative in case one or several cameras fail. The 2D camera, the 3D camera and/or the radar unit may be configured to detect patient and/or staff movement, in particular during a scan.

According to an embodiment, the output data comprises information about the patient and/or the environment. The information may for example be output acoustically and/or on a screen. For example, the output data may be designed such that it can help with positioning the patient, e.g. on a patient table. In particular the output data may comprise positioning advice and/or instructions. The positioning advice and/or instructions may for example be output acoustically and/or as text on a screen. The output data may thus advantageously serve as guidance for the patient and/or for medical and/or technical staff.

According to an embodiment, the output data comprises instructions to automatically adapt the workflow. For example, the output device may be connected to at least one examination system, e.g. medical imaging device, and the output data may be configured such that the parameters of the at least one examination system are adapted based on the environmental data and/or based on the patient data. In particular, the scan parameters of a medical imaging device may be automatically adapted. For example, if a patient movement has been detected, the scan may be restarted or the part of the scan which is affected by the patient movement may be repeated. In another example, if the patient's state of emotion is detected to be not OK, e.g. in pain or anxious, the scan may be automatically interrupted or shortened. Additionally and/or alternatively the output device may be connected to a controlling device or controller that is configured to adapt the environmental conditions, such as a humidity controller and/or a ventilation unit. Advantageously, this embodiment may allow an automatic optimization of the workflow and/or of the workflow conditions.

According to an embodiment, one of the sensor units is a camera, in particular a 2D camera and/or a 3D camera, wherein the camera is configured to collect patient image data, in particular coloured image data, from the patient, in particular including data from the patient's face. This embodiment may advantageously allow to collect patient related data, in order to improve the workflow reliability even with varying patient behaviour.

According to a preferred embodiment, the computing unit comprises an algorithm configured to determine whether the patient's state of emotion matches a predefined emotion state based on the coloured image data, wherein the computing unit is configured to initiate the output of output data when a match to the predefined emotion state is found, wherein the output data in particular comprises information about the emotion state and/or commands to cause an automatic adjustment of lighting. The coloured image data may in particular be RGB data. For example, a red coloured patient face may be an indication of anxiety, e.g. caused by claustrophobic reactions of the patient during a scan, in particular inside a scanning tunnel or gantry. The emotional state of the patient may not always be apparent and/or visible to the medical or technical staff. Patient anxiety may occasionally even lead to a termination of the scan. Furthermore, medical errors, such as motion artefacts, may result from a reactive response due to patient anxiety. Accordingly, the output data may be designed to warn the staff about the patient's anxiety, in particular such that the staff may try and calm the patient to reduce artifacts and/or stop the scan immediately if necessary. Advantageously, this embodiment may work as a detection and/or prediction mechanism of the patient's emotion. It may thus reduce unwanted fluctuations or response time to adverse patient reactions, e.g. reactions caused by device operation. The processing of the patient related data may include an anonymization of the data, in particular such that no data concerning the patient's emotion are stored in a way that they may be assigned to an individual patient later on.

According to an embodiment, the camera is configured to collect the patient image data of the patient's face, in particular when the patient is approaching the monitoring unit and/or entering an examination room, wherein the computing unit comprises a facial recognition algorithm and a patient database or an algorithm configured to access a patient database, wherein the computing unit is configured to identify a patient based on the patient image data and the patient database via the facial recognition algorithm, wherein the computing unit is in particular configured to automatically set a scanning protocol based on the recognized patient identity and based on the patient database. The patient database may include patient faces. An incorrect identification of the patient may lead to patient safety risks, in particular due to applying the wrong procedure and/or treatment, such as due to examination of the wrong patient, applying the wrong medication and/or an incorrect site intervention. Advantageously this embodiment may allow an automated patient identification and/or the application of a health information update of the patient database. Thus, the risk of errors and their consequences may be reduced. An automatic identification upon arrival of the patient may further help to save time and avoid forgetting of the staff to correctly double check the patient's identity.

According to an embodiment, one of the sensor units is a camera, in particular a 2D camera and/or a 3D camera, wherein the computing unit is configured to automatically detect a medical staff member via the camera upon arrival, wherein the computing unit is configured to automatically output information for this particular staff member as output data. The information for the staff member may for example comprise information about the monitoring unit about at least one device of the workflow, about errors and/or about the scan protocol to be applied. In a medical examination centre, e.g. a radiology centre, there may be different staff members with their respective different tasks. Thus, identifying the staff and automating the specific applications may help with executing these tasks more efficiently. The output data may further comprise instructions for at least one device to automatically adapt the user interface according to the detected staff member. Thus, an automatic device personalization depending on the individual staff member's tasks and/or requirements may be possible.

According to an embodiment, at least one of the sensor units is a camera, in particular a 2D camera and/or a 3D camera, wherein the camera is configured to detect movement of the patient, in particular during an examination, wherein the computing unit is configured to output information and/or instructions regarding the positioning of the patient based on the detected movement. For example, the output data may be such that it helps to position the body part to be examined in the iso-centre of the medical imaging device for a scan. The output data may also be suitable to guide a patient to "undo" an involuntary movement during an examination, e.g. the output data may comprise instructions to the patient on how to move back to his/her original position. This embodiment may thus help to detect and/or avoid motion artifacts that may for example appear as blurring, streaking, or shading and that may be caused by patient movement during an examination, in particular during a CT scan and/or x-ray examination. Early detection of movement may help to avoid the repetition of an examination and/or enable correction of movement-induced measurement errors. The output data may comprise a warning for the staff and/or the patient. The warning may in particular be triggered, when exceeding of a movement threshold based on the impact of the movement on image artefacts is detected, in particular as determined by the computing unit based on the patient movement data. Additionally and/or alternatively the movement data may be used to assist a patient positioning. Patient positioning may comprise choosing an ideal table height, in particular of a CT system's table, e.g. for adequate iso-centre localization. The table height may directly affect the techniques that allow automatic adjustment of tube current at different levels and thus radiation dose and image quality in a CT system. Accurate positioning of the patient in the CT gantry may in particular be essential for adequate image quality and radiation output when using tube current modulation. The computing unit may comprise an artificial intelligence (AI) algorithm configured to use the patient movement data in order to create output data that assists in the positioning of the patient. Due to the diversity of human shapes and bodies, the AI ex may offer far more accurate positioning than a positioning carried out by staff without guidance. AI-assisted patient positioning may thus help to accurately find the ideal iso-centre, which may directly affect a required radiation dose and image quality. As a result, it may be more efficient, save time, reduce radiation dose, and require less effort to obtain the desired scan. Alternatively and/or additionally, the computing unit may be configured to create instructions as output data based on the movement and/or positioning data of the patient that causes the power of a scanner to be adjusted automatically, e.g. in the x-ray tube. The adjustment of the power may be determined depending on the body part, e.g. higher power for bone. Optionally the camera data may be supported and/or replaced by data from the radar unit.

According to an embodiment, the computing unit is configured to monitor at least one predetermined surface via at least one of the sensor units, in particular via a camera, wherein the computing unit is configured to output a warning when a touching of the at least one surface by a person is detected, wherein the computing unit is optionally further configured to initiate a highlighting of the touched surface. The highlighting may for example executed by the output device. Therein the output device may be a projector projecting the highlighting onto the surface and/or a screen or output to a screen, the screen showing the surface together with the highlighting. Advantageously this embodiment may provide a surface touch detection in particular with regard to contamination-prone areas. Thereby, the medical workflow may be optimised, because only the touched surfaces need to be disinfected after the examination. This may save valuable time of the staff and decreases the (dead) time between two patient examinations and increase patient throughput.

According to an embodiment, the computing unit is configured to activate a hibernating mode for one or several of the sensor units when the sensor units are not needed according to a predetermined workflow protocol and/or when no patient is within a predetermined range of the monitoring unit. Additionally and/or alternatively, the computing unit may be further configured to activate and end a hibernating mode for external devices, in particular devices that are part of the workflow, based on the predetermined workflow protocol and/or on the presence and absence of the patient. The presence of a patient may for example be determined via a camera and/or via a radar unit. The workflow system may thus be optimized in terms of energy saving. Additionally and/or alternatively, based on the predetermined workflow and/or the detection of an approaching patient the computing unit may be configured to activate at least on sensor unit and/or end the hibernating mode of at least one of the sensor units. Hence the workflow may be optimized for an efficient warm-up period, e.g. decreasing wait times. For example, it may take some time for a CT scanner to be ready for an exam. It was found that the total energy consumption of a CT scanner for one year was 26 226 kWh (corresponding to $4721 in energy costs), which can be considered to be significant. The energy consumption of CT and MRI scanners can be comparable to the energy requirements of a city of 852 residents living in a four-person household, or 4% of the hospital's total annual energy consumption. Hence a hibernating mode when there are no examinations and/or operations based on people presence detection may allow significant savings of energy. Taking into account a schedule of workflows may further help to improve patient throughput by allowing the device to turn on before the patient arrives. This may also contribute to the reduction of costs.

According to an embodiment, the monitoring unit comprises a data connection, in particular a wireless data connection, wherein the computing unit is configured to control the data connection for distributing data to devices used during the workflow. The data connection may for example be a LAN connection and/or a wireless LAN connection and/or a Bluetooth connection. The data connection may be used to store sensor data and/or processed data on a storage device, e.g. in a cloud. The data connection may be used to receive data input for the computing unit that may in particular be used for the processing of the sensor data. For example, wearables with wireless connectivity may provide additional patient health data that can be collected nearby.

According to an embodiment, the computing unit is configured to modularly include algorithms, in particular artificial intelligence (AI) algorithms, for processing data from sensor units that are attached to the attachment slots. Advantageously the data obtained with the monitoring unit may thus be used to implement use cases that rely on machine learning and require a large amount of collected data. Additionally and/or alternatively, the computing unit may be configured to acquire data that can be output to an external device having an AI algorithm. Using the monitoring unit to acquire data for AI algorithms may have the advantage that the feedback is not prone to be subjective as user experience feedback may be. It may thus be possible to develop an understanding of customer and user behaviour based on more reliable data. Therein it may be possible to build an accurate machine learning model for potential applications, e.g. of the "digital twin" (such as adapting device settings to user-specific behaviours and requirements). The sensor units to be installed and/or part of the monitoring unit may provide large amounts of data to be collected over time. Due to the training data, a more efficient analysis may be enabled allowing potential use cases based on machine learning. If enough data is collected, it may be further possible to adjust the settings of devices and/or of the monitoring unit and calibrate it according to the specific behaviour of the user, e.g. the patients and/or the staff, to improve operational efficiency. Additionally and/or alternatively, it may be possible to collect data around the medical devices of the workflow that may allow for better understanding the behaviour of the user, e.g. the staff, and the patient. AI-powered use cases may profit from the thus acquired sufficiently large amounts of data to reasonably capture the correlations between input and output features. By observing patients, it may also be possible to observe and detect pain, which can help identify the relationship between patients' experience of various scanning protocols and/or workflows and the patient's clinical condition. For such applications, it may be necessary to collect enough data to develop more complex and accurate models to improve the performance of such machine learning algorithms. Furthermore, an AI algorithm may be trained with the help of the sensor data to enable an improved image quality acquired via the medical workflow. The AI algorithm may, e.g., be a deep learning algorithm.

According to an embodiment, the output device comprises a beam projector, wherein the beam projector is in particular configured to project the output data on a surface. The beam projector may for example be a laser beam projector. The beam projector may be configured to send simple messages (e.g., cleaning instructions, system messages, breathing instruction, instruction for patient movement, e.g. to undo involuntary movement during an examination) to the patient table or other surfaces. The beam projector may comprise a motorization and/or a motorized lens system to redirect the beam.

According to a further aspect of embodiments of the present invention, a medical examination system, in particular medical imaging system, is provided, comprising the monitoring unit as described herein. All features and advantages of the monitoring unit may be adapted to the medical examination system and vice versa. The medical examination system may for example be a CT scanner or an MR scanner. The medical examination system may comprise a monitor and/or screen in communication with the output device. The monitor and/or screen may be located at and/or attached to a scanning tunnel and/or gantry. The screen may for example be used to help control a breathing pattern for patient by showing instructions to the patient.

According to a further aspect a method for supporting a medical workflow for examining a patient is provided, the method comprising the steps
  collecting patient related data via at least one first sensor unit;
  collect environmental data via at least one second sensor unit, the first and second sensor unit being the same or different sensor units;
  sending the patient related data and the environmental data to a computing unit;
  creating output data based on the patient related data and/or the environmental data by the computing unit, wherein the output data is suitable to support the medical workflow;
  sending the output data from the computing unit to an output device;
  outputting the output data via the output device.

The method may be carried out by a monitoring unit as described herein. In particular, the first and second sensor unit, the computing unit and the output device may be as described herein. They may be part of the monitoring unit. All features and advantages of the monitoring unit and of the medical examination system may be adapted to the method and vice versa.

FIG. 1 shows a monitoring unit 1 according to an embodiment of the present invention. The monitoring unit 1 comprises two 2D cameras 11 and a 3D camera 12, which may in particular be a 3D depth camera. The two 2D cameras 11 are facing forward and are configured to for analysing the emotional state of patients, technicians or doctors and collect anonymized data from the video streams. To protect privacy, personally identifiable information may be removed. The 3D camera 12 is facing downward to provide a field of view above an examination space, in particular above a patient table. The 3D camera 12 may also collect data from the patients, e.g. emotional data and/or pain detection. The 3D data may be anonymised as well. The monitoring unit 1 further comprises a radar unit 13 and attachment slots 4, where further sensor units 10 are attached to the base body 2 of the monitoring unit 1. The further sensor units 10 comprise environmental senso units such as a temperature sensor, a TVOC sensor a $CO_2$ sensor and a vibration sensor. The monitoring unit 1 may comprise vents (not shown) so that the monitoring unit 1 is able to collect data from the medical device environment more efficiently. These sensor units 10 may be configured to collect data continuously and the data may be stored either in a cloud, i.e. externally of the monitoring unit 1, or on local storage, e.g. for other data consumers to access. Some free attachment slots 4 allow for further sensor units 10 to be optionally attached to the monitoring unit 1 if required. The base body 2 may preferably be configured such that additional attachment slots 4 for further sensor units 10 can be added with relatively low service requirements. A computing unit 3 (not shown here) is within the base body 2 and connected to the sensor units 10. The computing unit 1 may for example be a Nvidia Jetson Nano. The purpose of the computing unit 1 is in particular to provide computing power for any necessary algorithms to process data from the sensor units 10 including the cameras 11, 12 and the radar unit 13. Further the purpose may be to provide a wireless LAN for distributing data to other data consumers or other edge computing devices in case additional computing power is needed for desired applications. The cameras 11, 12, the radar unit 13 and the further sensor units 10 are connected and/or in communication with the computing unit. The monitoring unit further comprises output device 5 comprising a beam projector 21 and a Wi-Fi connection (not shown).

Figure 2:
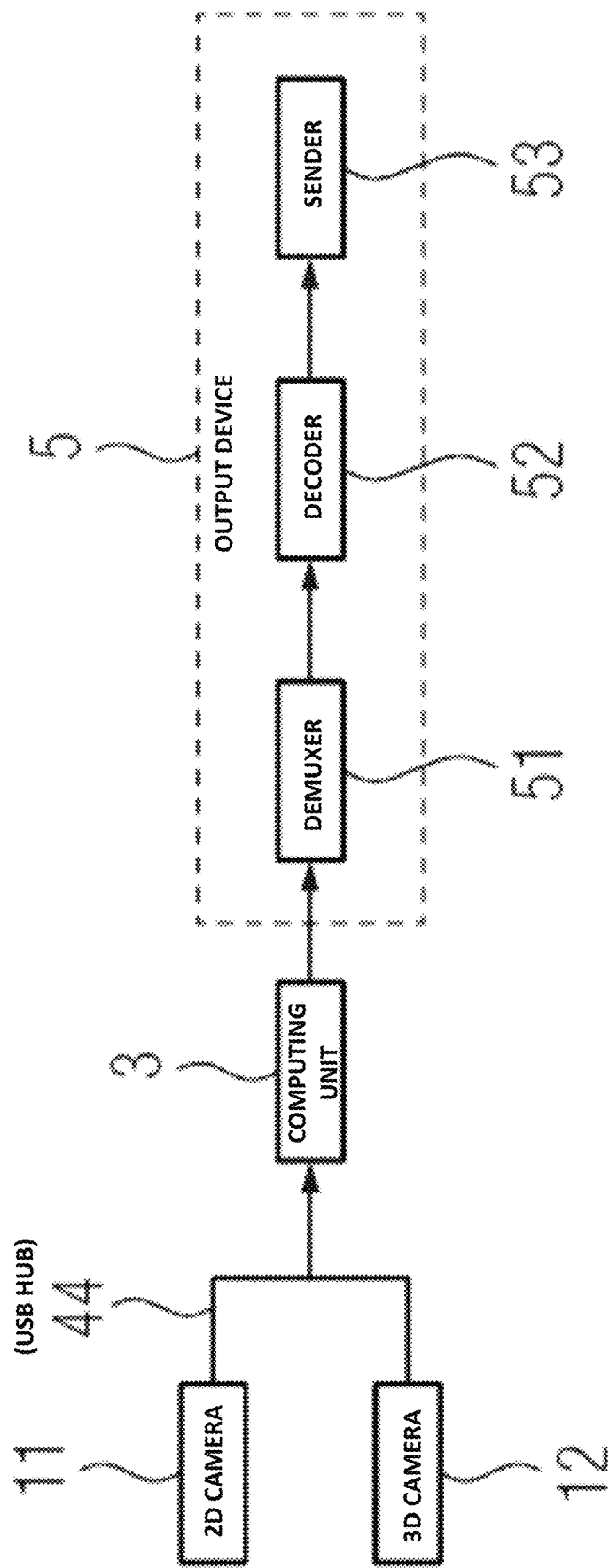
FIG. 2 shows a schematic representation of the connection of the cameras to the computing unit.

FIG. 2 shows a schematic representation of the connection of the 2D cameras 11 and 3D cameras 12 to the computing unit 3. The cameras 11, 12 are connected to the computing unit 3 via a USB hub 44 and the computing unit 3 is connected to an output device 5. The output device 5 may comprise a demuxer 51, a decoder 52 and/or a sender 53 configured to send data via an IP address. For example, data, e.g. video data and/or video raw data, may be transmitted through the IP address using a Gstreamer pipeline.

Figure 3:
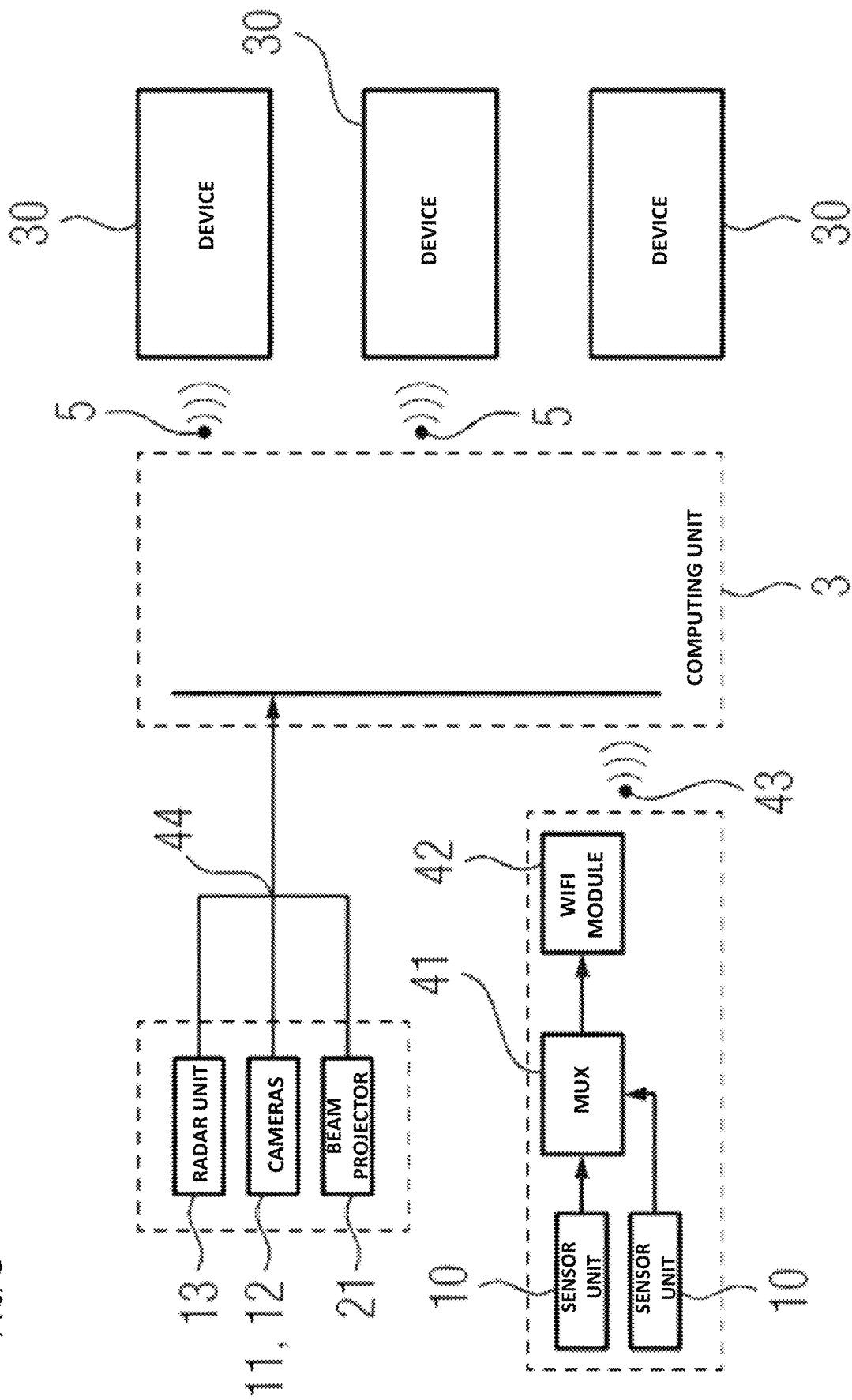
FIG. 3 shows a schematic representation of the working principle of the monitoring unit.

FIG. 3 shows a schematic representation of the working principle of the monitoring unit 1. Data, in particular patient related data, from some sensor units 10, i.e. from the radar unit 13 and the 2D and 3D cameras 11, 12 are transmitted to the computing unit 3 via a USB hub 44. The computing unit 3 can process the data and generate output data that is output via output device 5 including a beam projector 21 and wireless connections 5, such as Wi-Fi and Bluetooth. The beam projector 21 is connected to the computing unit via the USB hub 44. The data sent via the wireless connection 5 may be sent to various devices 30, such as a user's workstation, a laptop, a table a smart phone or Teamplay. Further sensor units 10, e.g. environmental sensor units, may be connected to the computing unit via a wireless connection, in particular Wi-Fi connection 43. The Wi-Fi connection 43 may be established via a multiplexor 41 connected to the sensor units 10 and via a Wi-Fi module 42.

Figure 4:
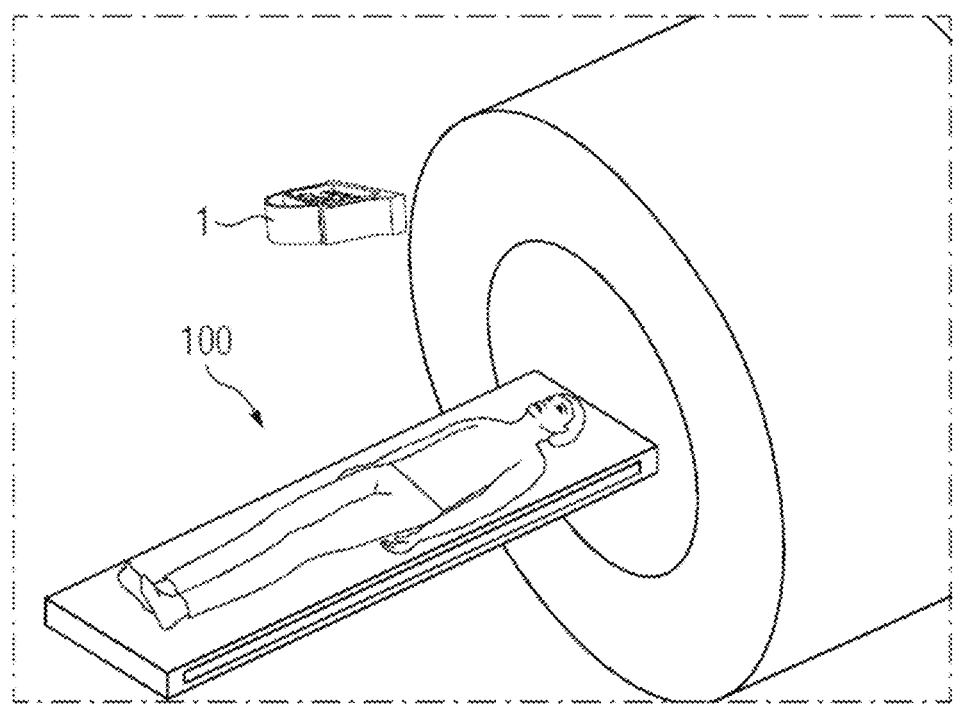
FIG. 4 shows a medical examination system according to an embodiment of the present invention.

FIG. 4 shows a medical examination system 100 according to an embodiment of the present invention comprising the monitoring unit 1. The medical examination system 100 may for example be a computed tomography (CT) system.

The monitoring unit 1 can be mounted to a front side of a ring-shaped gantry of the computed tomography (CT) system. In particular, the monitoring unit 1 can be mounted to a section of a front cover of the ring-shaped gantry, that section of the front cover being located above the entry hole of the CT tunnel, into which a patient can be inserted for examination. The monitoring unit 1 may be fixed, for example, with screws to the front cover and/or to a support structure of the gantry.

The straight side portion of the monitoring unit 1 may be fitted, for example, to the section of the front cover, in particular in a form-fitting manner. The straight side portion of the monitoring unit 1 is arranged opposite the convex side portion of the monitoring unit 1. The convex side portion of the monitoring unit 1 covers the two 2D cameras 11 and the beam projector 21.

The convex side portion of the monitoring unit 1 may be made, for example, of transparent and/or semi-transparent material. For example, the semi-transparent material may hide the two 2D cameras 11 and the beam projector 21 from a user's view while allowing the two 2D cameras 11 to see through the convex side portion of the monitoring unit 1 and/or allowing the beam projector 21 to project a beam through the convex side portion of the monitoring unit 1.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

What is claimed is:

1. A monitoring unit to support a medical workflow for examining a patient, the monitoring unit comprising:
    a base body including multiple attachment slots for modular attachment of sensor units to the base body;
    multiple sensor units, each of the multiple sensor units being at least one of attached to one of the multiple attachment slots or permanently fixed to the base body, wherein
        at least one of the multiple sensor units is configured to collect patient related data, and
        at least one of the multiple sensor units is configured to collect environmental data; and
    a computing device configured to
        process the patient related data and the environmental data,
        create output data based on at least one of the patient related data or the environmental data, the output data being suitable to support the medical workflow, and
        initiate output of the output data via an output device, which is connected to the computing device, the output device being configured to receive the output data from the computing device and to output the output data.

2. The monitoring unit according to claim 1, wherein the multiple sensor units include at least one of a 2D camera, a 3D camera, a $CO_2$ sensor, a humidity sensor, a total volatile organic compound sensor configured to detect particles in ambient air, a temperature sensor, a vibration sensor, or a radar unit.

3. The monitoring unit according to claim 2, wherein the multiple sensor units include each of the 2D camera, the 3D camera, the $CO_2$ sensor, the humidity sensor, the total volatile organic compound sensor, the temperature sensor, the vibration sensor, and the radar unit.

4. The monitoring unit according to claim 1, wherein the output data comprises instructions to automatically adapt the medical workflow.

5. The monitoring unit according to claim 1,
    wherein at least one of the multiple sensor units is a camera, and
    wherein the camera is configured to collect patient image data.

6. The monitoring unit according to claim 5,
    wherein the computing device includes an algorithm configured to determine whether a state of emotion of the patient matches a defined emotion state based on the patient image data,
    wherein the computing device is configured to initiate the output of output data in response to determining that the state of emotion matches the defined emotion state, and
    wherein the output data includes information about at least one of the state of emotion or commands to cause an automatic adjustment of lighting.

7. The monitoring unit according to claim 6,
    wherein the patient image data is patient image data of a face of the patient when the patient is at least one of approaching the monitoring unit or entering an examination room,
    wherein the computing device includes a facial recognition algorithm and a patient database or an algorithm configured to access the patient database, and
    wherein the computing device is configured to
        identify the patient based on the patient image data and the patient database via the facial recognition algorithm, and
        automatically set a scanning protocol based on a recognized patient identity and the patient database.

8. The monitoring unit according to claim 7, wherein the computing device is configured to
    monitor at least one surface via at least one of the multiple sensor units, the at least one of the multiple sensor units including a camera, and output a warning in response to detecting a touching of the at least one surface by a person.

9. The monitoring unit according to claim 8, wherein the computing device is configured to activate a hibernating mode for one or more of the multiple sensor units at least one of when the multiple sensor units are not needed according to a workflow protocol or when no patient is within a threshold range of the monitoring unit.

10. The monitoring unit according to claim 6, wherein the computing device is configured to
monitor at least one surface via at least one of the multiple sensor units, the at least one of the multiple sensor units including a camera, and
output a warning in response to detecting a touching of the at least one surface by a person.

11. The monitoring unit according to claim 6,
wherein the computing device is configured to activate a hibernating mode for one or more of the multiple sensor units at least one of when the multiple sensor units are not needed according to a workflow protocol or when no patient is within a threshold range of the monitoring unit.

12. The monitoring unit according to claim 5,
wherein the patient image data is patient image data of a face of the patient when the patient is at least one of approaching the monitoring unit or entering an examination room,
wherein the computing device includes a facial recognition algorithm and a patient database or an algorithm configured to access the patient database, and
wherein the computing device is configured to
identify the patient based on the patient image data and the patient database via the facial recognition algorithm, and
automatically set a scanning protocol based on a recognized patient identity and the patient database.

13. The monitoring unit according to claim 5,
wherein the camera is a 2D camera or a 3D camera, and
wherein the patient image data is coloured image data from a face of a patient.

14. The monitoring unit according to claim 1,
wherein at least one of the multiple sensor units is a camera,
wherein the computing device is configured to automatically detect, via the camera, a medical staff member upon arrival, and
wherein the computing device is configured to automatically output information for the medical staff member as the output data.

15. The monitoring unit according to claim 1,
wherein at least one of the multiple sensor units is a camera,
wherein the camera is configured to detect movement of the patient, and
wherein the computing device is configured to output at least one of information or instructions regarding positioning of the patient based on the movement of the patient.

16. The monitoring unit according to claim 15, wherein the camera is configured to detect the movement of the patient during an examination.

17. The monitoring unit according to claim 1, wherein the computing device is configured to
monitor at least one surface via at least one of the multiple sensor units, the at least one of the multiple sensor units including a camera, and
output a warning in response to detecting a touching of the at least one surface by a person.

18. The monitoring unit according to claim 17, wherein the computing device is configured to initiate a highlighting of the at least one surface.

19. The monitoring unit according to claim 1,
wherein the computing device is configured to activate a hibernating mode for one or more of the multiple sensor units at least one of when the multiple sensor units are not needed according to a workflow protocol or when no patient is within a threshold range of the monitoring unit.

20. The monitoring unit according to claim 1, further comprising:
a wireless data connection, and
wherein the computing device is configured to control the wireless data connection to distribute data to devices used during the medical workflow.

21. The monitoring unit according to claim 1, wherein the computing device is configured to modularly include algorithms to process data from sensor units attached to the attachment slots.

22. The monitoring unit according to claim 1,
wherein the output device includes a beam projector, and
wherein the beam projector is configured to project the output data on a surface.

23. A medical imaging system comprising the monitoring unit according to claim 1.

24. The monitoring unit of claim 1, wherein the base body is a housing.

25. A method for supporting a medical workflow for examining a patient, the method comprising:
collecting patient related data via at least one first sensor unit;
collecting environmental data via at least one second sensor unit, the at least one first sensor unit and the at least one second sensor unit being the same or different sensor units;
sending the patient related data and the environmental data to a computing device;
creating, by the computing device, output data based on at least one of the patient related data or the environmental data, the output data being suitable to support the medical workflow;
sending the output data from the computing device to an output device; and
outputting the output data via the output device.

* * * * *